United States Patent [19]

Decouzon

[11] 4,216,842
[45] Aug. 12, 1980

[54] ANTI-GURGLE APPARATUS FOR A POWER-STEERING VALVE

[75] Inventor: Georges Decouzon, Guyancourt, France

[73] Assignee: Regie Nationale des Usines Renault, Boulogne-Billancourt, France

[21] Appl. No.: 942,309

[22] Filed: Sep. 14, 1978

[30] Foreign Application Priority Data

Sep. 29, 1977 [FR] France ............................. 77 29260

[51] Int. Cl.² ................................................ B62D 5/06
[52] U.S. Cl. ...................................... 180/146; 74/492; 64/27 NM
[58] Field of Search ................. 180/132, 146, 147; 74/492, 493, 490; 64/11 F, 27 NM

[56] References Cited

U.S. PATENT DOCUMENTS

| 2,226,656 | 12/1940 | Best | 64/11 F |
|---|---|---|---|
| 2,753,848 | 7/1956 | Burton | 180/146 X |
| 2,953,932 | 9/1960 | Lincoln | 180/147 X |
| 3,301,011 | 1/1967 | Dye et al. | 64/27 NM |
| 3,543,538 | 1/1970 | Farrell et al. | 74/492 |

FOREIGN PATENT DOCUMENTS

| 1166636 | 3/1964 | Fed. Rep. of Germany | 180/146 |
| 2205032 | 5/1974 | France . | |

Primary Examiner—John A. Pekar
Attorney, Agent, or Firm—Oblon, Fisher, Spivak, McClelland & Maier

[57] ABSTRACT

An anti-gurgle apparatus for a power-steering valve obtained by the interposition between the axle of the power-steering valve and that of the steering column of an assembly which includes a housing connected to the steering column and the power-steering valve, a cover, a fastening member interconnecting the cover to the housing, a clamp member including at least two tabs which engage the axis of the power-steering valve, a plurality of pin members, a first end portion of each respectively fixedly connecting each of the tabs with the disc of rubber, and a support element connected to a second end portion of the pin member.

5 Claims, 4 Drawing Figures

ANTI-GURGLE APPARATUS FOR A POWER-STEERING VALVE

BACKGROUND OF THE INVENTION

1. Field of the Invention

The present invention relates to an anti-gurgle device for powersteering valves.

2. Description of the Prior Art

It is known that such valves generally emit sounds from circulating oil when they are in operation. These sounds are apparent to the driver when the valve is situated near the floor since they are transmitted simultaneously through the air and mechanically along the steering column.

SUMMARY OF THE INVENTION

One object of the present invention is to eliminate vibrations in the passenger compartment of a motor vehicle from a power-steering valve which are mechanically transmitted through the steering column of a vehicle during operation.

BRIEF DESCRIPTION OF THE DRAWINGS

Various other objects, features and attendant advantages of the present invention will be more fully appreciated as the same becomes better understood by reference to the detailed description when considered in connection with the accompanying drawings in which like reference characters designate like or corresponding parts throughout the several views, and wherein.

DETAILED DESCRIPTION OF THE PREFERRED EMBODIMENTS

Figure 1:
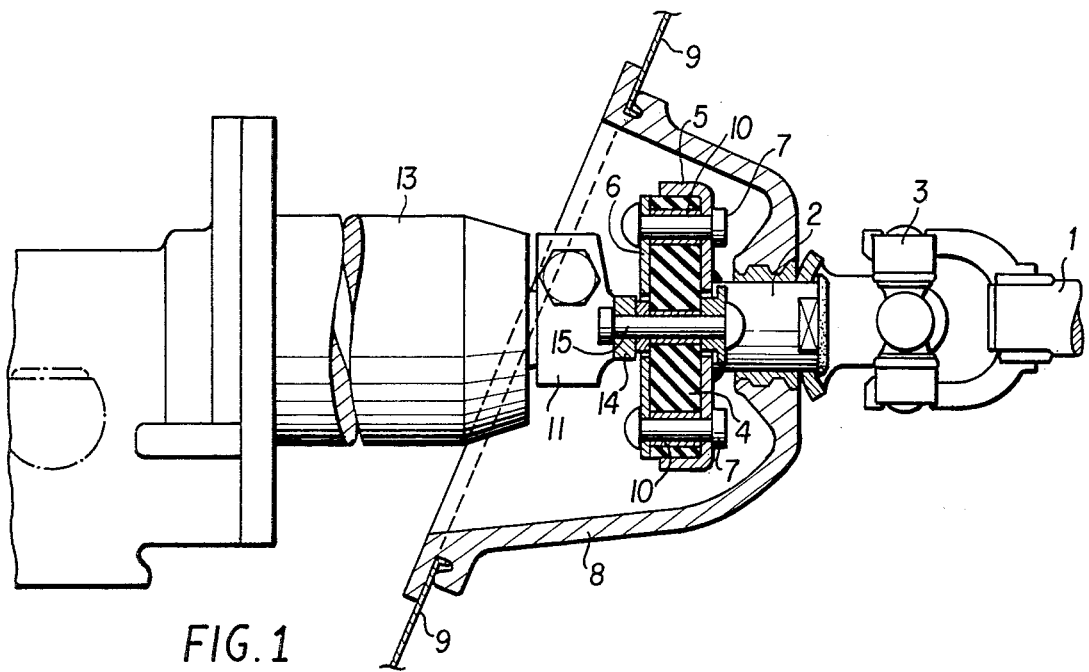
FIG. 1 shows the arrangement of the invention, and in particular a longitudinal cross section view taken along I—I passing both through the rivets fastening the housing and cover and through the pins of the clamp.
Figure 2:
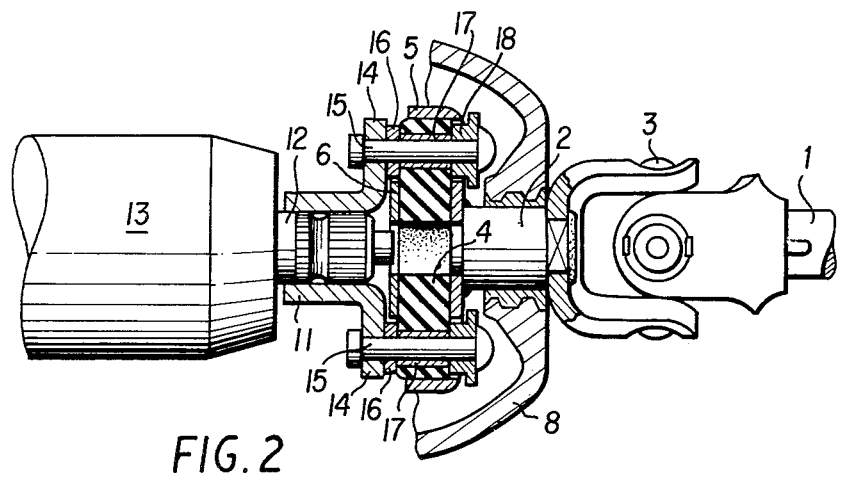
FIG. 2 shows a longitudinal section view taken along II—II passing only through the pins of the clamp.

First considering then FIGS. 1 and 2, the steering wheel, not shown, is disposed to the right of FIG. 1 and is prolonged by the steering column 1, connected to the intermediate axle 2 by means of a universal joint 3.

A disk of rubber called a "flector" 4, which concerns an elastic coupling which therefore allows a slight disalignment between separate axles, as for example, the axles 2 and 12, is mounted within a circular housing 5 and a cover 6 is fastened to the flector 4 by two rivets 7 passing through spacers 10.

The intermediate axle member 2 is welded to the housing 5 and serves to support a thick elastomer hood 8 which surrounds the preceding assembly and extends to the floor 9 adjacent steering column 1 as shown in FIGS. 1 and 2. This arrangement aims at eliminating noise coming from the valve through the air.

Figure 3:
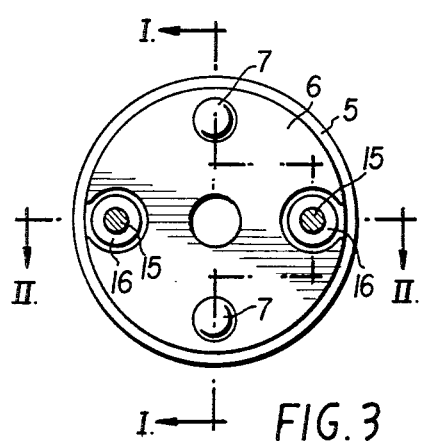
FIG. 3 is a view facing the cover.
Figure 4:
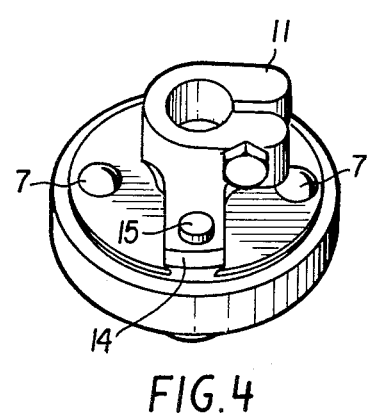
FIG. 4 is a perspective view of the arrangement from the valve side.

On the opposite side of the arrangement a clamp 11, integral with the axle 12 of the power steering valve 13, has at least two tabs 14 each holding a pin 15 which passes through the rubber flector 4. As shown in FIG. 3, the pins 15 and rivets are separately and alternately positioned about the axis of rotation of the cover 6 and constitute separate structural elements.

The cover 6 is notched around each tab 14 so that the latter is, by the intermediary of a washer 16, in contact with the flector 4 and spacers 17 projecting through flector 4, each spacer 17 itself being traversed by a pin 15.

In the same manner, facing each of the spacers 17 are openings in the housing 5 for the passage of support elements 18 against which the outer ends of the pins 15 rest. Further, the cover 6 and the flector 4 have a central opening facing the free end of the axle 12.

One of the essential characteristics of the present invention resides in the fact that the diameter of the notches in the cover 6 and housing 5 is distinctly greater than that of the washers 16 and the support elements 18. The aim of this is to permit some freedom of angular displacement of the pins 15 exclusively in contact with the elastomer of the flector 4.

As long as the above-noted amplitude of angular displacement is not exceeded it is clear that the steering wheel and the axle 12 of the valve 13 are connected elastically. This entails then the elimination in the passenger compartment of vibrations coming from the valve 13 and mechanically transmitted through the steering column and the resultant noise.

These conditions are satisfied in normal operation of the power-steering valve 13, since the torque on the steering column does not then exceed 0.8 mkg, which is insufficient to crush the rubber of the flector 4 to the point of establishing metal-on-metal contact. It will be noted that the flector 4 works exclusively by angular shear, to the exclusion of any deformation in compression, due to the presence of the spacers between the housing and cover.

For a torque on the steering column greater than the valve noted above, possibly up to 3 mkg, notably in turning the steering wheel when the motor is not running, the mechanical connection is reestablished.

In effect, under these conditions, the washers 16 and the support elements 18 integral with the pins 15 and thus the axle 12, respectively, come into contact with the cover 6 and the circular housing 5, after crushing of the thickness of the flector elastomer left free for the preceding type of operation. The thickness is determined experimentally, since it depends on many factors, such as the hardness of the elastomer, the weight of the vehicle, the maximum permissible torque in elastic operation, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An anti-gurgle apparatus for a power-steering valve interposed between an axle of the power-steering valve and the steering column of an assembly which comprises:

a housing connected to said steering column and said power-steering valve;

a cover;

a disk of rubber disposed between said housing and said cover;

fastening means interconnecting said cover with said housing;

a clamp member including at least two tabs which engage said axle of said power-steering valve;

a plurality of pin members separate from said fastening means, a first end portion of which respectively fixedly interconnect each of said tabs with said disk or rubber; and a support element connected to a second end portion of each of said plurality of pin members for supporting said second end portion.

2. An anti-gurgle apparatus as set forth in claim 1, which further comprises:

a washer mounted on each of said plurality of pin members wherein said cover and said housing are notched for the passage of said plurality of pin members so as to permit centered emplacement of said washer and said support element, respectively, on each of said plurality of pin members, and to further form a space between different metal pieces so as to allow relative angular displacement of the same, effected in an elastic manner due to the presence of said rubber disk which is freely deformable within the limits of said space.

3. An anti-gurgle aparatus as set forth in claim 1, which further comprises:

a floor member through which said power steering valve extends;

an elastomer hood connected to and surrounding said housing adjacent said steering column and further connected to said floor member for eliminating noise coming from said power steering valve.

4. An anti-gurgle apparatus as set forth in claim 3 which further comprises:

an intermediate axle member interconnecting said steering column and said housing, said elastomer hood being mounted on said intermediate axle.

5. An anti-gurgle apparatus as set forth in claim 1, said fastening means comprising at least one pair of fasteners and said plurality of pin members comprising at least one pair of pin members wherein said fasteners and said pin members are radially, alternately positioned about the axis of rotation of said cover.

* * * * *